US006431122B1

United States Patent
Westrick et al.

(10) Patent No.: US 6,431,122 B1
(45) Date of Patent: *Aug. 13, 2002

(54) WIRELESS CONFINEMENT AND TRAINING SYSTEM FOR AN ANIMAL

(75) Inventors: Michael D. Westrick; Scott E. Maddox; Peter F. Johnson, all of Fort Wayne; Timothy J. Hacha, Hoagland, all of IN (US)

(73) Assignee: Innotek, Inc., Garrett, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/717,505

(22) Filed: Nov. 21, 2000

(51) Int. Cl.[7] ............................................. A01K 15/04
(52) U.S. Cl. ..................................... 119/721; 340/573.3
(58) Field of Search ................................ 119/712, 721, 119/720; 340/573, 573.3, 606.6

(56) References Cited

U.S. PATENT DOCUMENTS

| 4,898,120 A | * | 2/1990 | Brose ........................... 119/29 |
| 4,967,695 A | | 11/1990 | Giunta ......................... 119/29 |
| 5,067,441 A | * | 11/1991 | Weinstein .................... 119/29 |
| 5,381,129 A | | 1/1995 | Boardman .................. 340/573 |
| 5,425,330 A | | 6/1995 | Touchton et al. ........... 119/721 |
| 5,435,271 A | | 7/1995 | Touchton et al. ........... 119/721 |
| 5,460,124 A | | 10/1995 | Grimsley et al. ............ 119/721 |
| 5,559,498 A | * | 9/1996 | Westrick et al. ............. 340/573 |
| 5,576,694 A | | 11/1996 | Touchton et al. ........... 340/573 |
| 5,606,936 A | * | 3/1997 | Davis ........................... 119/721 |
| 5,642,690 A | * | 7/1997 | Calabrese et al. ........... 119/721 |
| 5,682,839 A | | 11/1997 | Grimsley et al. ............ 119/721 |
| 5,852,403 A | | 12/1998 | Boardman .................. 340/573 |
| 5,872,516 A | * | 2/1999 | Bonge, Jr. ................... 340/573 |
| 5,913,284 A | * | 6/1999 | Van Curen et al. ......... 119/720 |
| 6,019,066 A | * | 2/2000 | Taylor .......................... 19/720 |
| 6,114,957 A | * | 9/2000 | Westrick et al. ......... 340/568.1 |
| 6,163,261 A | * | 12/2000 | Westrick .................. 340/573.3 |
| 6,232,880 B1 | * | 5/2001 | Andersen et al. ......... 340/573.3 |
| 6,271,757 B1 | * | 8/2001 | Touchton et al. ......... 340/573.1 |

* cited by examiner

Primary Examiner—Charles T. Jordan
Assistant Examiner—Danielle Rosenthal
(74) Attorney, Agent, or Firm—Taylor & Aust, P.C.

(57) ABSTRACT

A method of providing wireless animal confinement includes the steps of selecting a location of a transmitter assembly; attaching a receiver assembly to the animal, the receiver assembly being adapted to selectively provide a corrective stimulation to the animal; selecting a first distance between the transmitter assembly and the receiver assembly to define a first zone within which no corrective stimulation is provided to the animal by the receiver assembly; selecting a second distance between the transmitter assembly and the receiver assembly to define a second zone beyond the first zone within which the corrective stimulation is provided to the animal by the receiver assembly; and selecting a third distance between the transmitter assembly and the receiver assembly to define a third zone beyond the second zone within which the animal will receive no further corrective stimulation from the receiver assembly.

35 Claims, 4 Drawing Sheets

Fig. 4

WIRELESS CONFINEMENT AND TRAINING SYSTEM FOR AN ANIMAL

BACKGROUND OF THE INVENTION

1. Field of the Invention

The present invention relates to an animal confinement system, and, more particularly, to a wireless confinement system for an animal.

2. Description of the Related Art

Pet confinement systems often include a radio frequency transmitter having a wire loop for transmitting the radio frequency signal. The wire loop antenna roughly defines the boundary in which the animal is to be confined. The animal wears a receiving unit that is attached to its collar. If the animal gets within a predetermined distance of the wire loop antenna, the receiver unit detects the radio frequency signal transmitted from the loop antenna, whereupon a correcting stimulus such as an electrical shock is applied to the animal. A problem is that it is difficult and time consuming to lay the ground loop antenna. If a discontinuity in the wire loop antenna occurs, it is then necessary to locate and repair the discontinuity. Furthermore, once the wire loop antenna is laid into the ground, the boundaries of the animal's confinement area are fixed, and cannot be easily modified.

It is also known to use a wireless system to track a target, e.g., an article, animal or person. One such wireless system transmits an ultrasound signal to a receiver unit carried by the animal. In response to receiving the ultrasound signal, the receiver unit transmits a radio frequency signal back to the transmitter of the ultrasound signal. Since the speed of sound is known, and radio frequency signals travel practically instantaneously at the speed of light, the transmitting unit can calculate how far away from the transmitter the receiving unit is located based upon the time interval between transmitting the ultrasound signal and receiving the radio frequency signal. If that time interval exceeds a predetermined threshold, indicating that the receiving unit is further than a threshold distance away from the transmitting unit, a second radio frequency signal is transmitted from the transmitting unit to the receiving unit. Upon receiving the second radio frequency signal, the receiving unit applies a correcting stimulus to the animal.

In another such system, the transmitter modulates transmitted electromagnetic signals to produce and transmit non-random patterns of electromagnetic energy. The receiver receives the electromagnetic signals and compares the signal level of the received electromagnetic signals from the transmitter with a predetermined level. If the signal level of the received electromagnetic signals from the transmitter is less than the predetermined level, then an electronic indication of a loss of signal is produced. In addition, the phase of the modulation of the received electromagnetic signals from the transmitter is compared with a reference phase. If the phase of the received electromagnetic signals from the transmitter is not substantially in phase with the reference phase, then the electronic indication of a loss of phase is produced. The receiver also is capable of producing a warning stimulus to the pet and a control stimulus to the pet. When there is no electronic indication of a loss of signal and there is no electronic indication of a loss of phase, then the pet is considered to be in the containment area and there is no warning stimulus and there is no control stimulus to the pet. When there is an electronic indication of a loss of signal and there is no electronic indication of a loss of phase, then there is a warning stimulus to the pet. When there is an electronic indication of a loss of signal and there is an electronic indication of a loss of phase, then there is a control stimulus to the pet.

There are many problems with a wireless containment system as described above. One problem is that if the pet proceeds through the active range of the receiver/transmitter pair, the pet will continuously receive correction so long as the pet is outside the containment area or until the receiver battery has run down. Such prolonged correction of the pet without trainer intervention is ineffective, and subjects the pet to unnecessary discomfort.

In addition, using a phase detection circuit requires a large amount of output power from the transmitting unit to achieve a usable containment radius. Transmitting such a high signal level creates a potential radiation hazard for anyone in close, constant proximity to the transmitter. In order to obtain the required power, the transmitter must be supplied AC power from a household outlet. This limits the utility of the system in many ways: 1) the system is not portable, and 2) since the system is plugged into a wall outlet, much of the usable containment area is consumed by the house itself. In addition, the system is not weather resistant. Furthermore, at the receiver end of the system, using a phase detection scheme requires continuous operation, thus consuming the receiver battery more rapidly. Since such a system uses the absence of a signal to determine position relative to the containment zone, a failure within the transmitting or receiving circuit could potentially result in the animal receiving a corrective stimulus while inside the containment zone. Finally, such a prior system provides no means for applying corrective training stimulation from a separate handheld transmitter.

Therefore, what is needed in the art is a wireless animal confinement system, which: 1) efficiently uses both transmitter and receiver power to promote long battery life and low maintenance, 2) is portable and weather resistant to allow placement of the containment field in the exact area desired by the user, 3) contains built-in-test (BIT) circuitry to monitor the health of both the transmitter and receiver to prevent stimulation in the event of a failure in either unit, 4) has the capability to use a second handheld transmitter to support an independent training function and 5) does not subject the monitored animal to unnecessary discomfort due to unproductive corrective stimulation.

SUMMARY OF THE INVENTION

The present invention provides a wireless animal confinement method and system which solves one or more the listed shortcomings of the prior methods and systems.

In one form of the present invention, a location of a containment transmitter assembly is selected, and a receiver assembly is attached to the animal. The receiver assembly is adapted to selectively provide a corrective stimulation to the animal. The method of the invention includes the steps of selecting a first distance between the containment transmitter assembly and the receiver assembly to define a first zone within which no corrective stimulation is provided to the animal by the receiver assembly; selecting a second distance between the containment transmitter assembly and the receiver assembly to define a second zone beyond the first zone within which corrective stimulation is provided to the animal by the receiver assembly; and selecting a third distance between the containment transmitter assembly and the receiver assembly to define a third zone beyond the second zone within which the animal will receive no further corrective stimulation from the receiver assembly.

In another form of the invention, a location of a self contained, portable containment transmitter assembly is selected, and a receiver assembly is attached to the animal. The receiver assembly is adapted to selectively provide a corrective stimulation to the animal. The invention selects a distance between the containment transmitter assembly and the receiver assembly to define a zone within which no corrective stimulation is provided to the animal by the receiver assembly. A second zone within which the animal will receive no further corrective stimulation from the receiver assembly is defined automatically within the system.

In both forms of the invention described above, the receiver unit is further responsive to a training transmitter to deliver corrective stimulation when activated. This response is independent from any signal received from the containment transmitter.

One advantage of the invention is that it requires much less power than other types of wireless containment system allowing for longer periods between maintenance. Another advantage is that since the system can be portable and weather resistant, the containment field can be established in a more exact and useful area.

Another advantage of this system is the capability to independently train the animal using the same collar used by the containment system. An additional advantage of the invention is that the animal ceases receiving correction stimuli once the animal exceeds a predetermined distance from the transmitter assembly or a predetermined amount of consecutive stimulations have been applied, to thereby spare the animal from unnecessary discomfort due to unproductive corrective stimulation.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrates two variants of the preferred embodiment of the invention, and such exemplifications are not to be construed as limiting the scope of the invention in any manner.

DETAILED DESCRIPTION OF THE INVENTION

Figure 1:
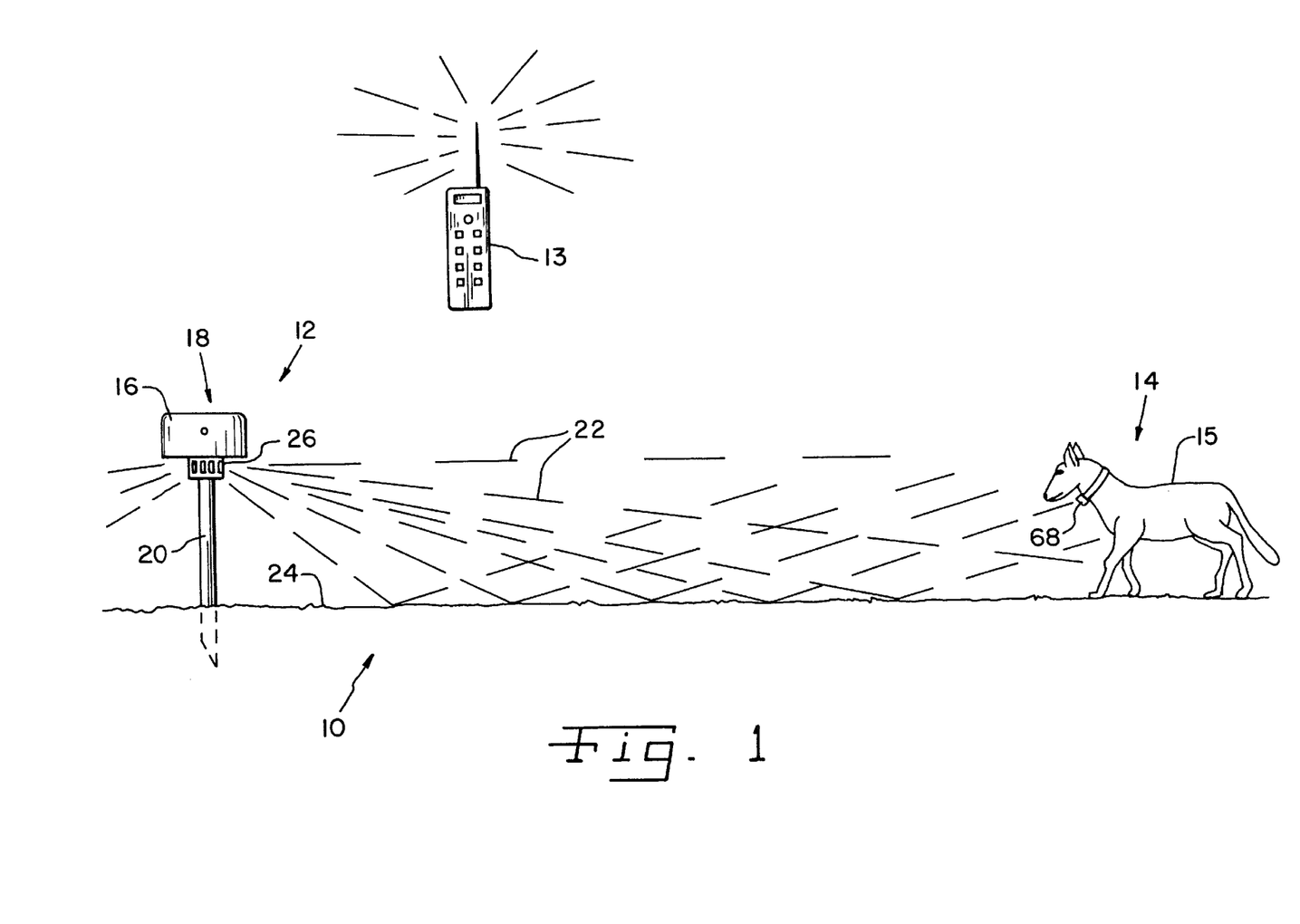
FIG. 1 is a perspective view of one embodiment of the wireless animal confinement system of the present invention.

Referring now to the drawings and particularly to FIG. 1, a wireless animal confinement system 10 of the present invention includes a containment transmitter assembly 12, a training transmitter 13, and a receiver assembly 14 shown attached to the collar of an animal 15. The combination containment and training system is useful, for example, to curb unwanted behavior (digging, barking etc.) while the animal is within a containment zone.

Figure 2:
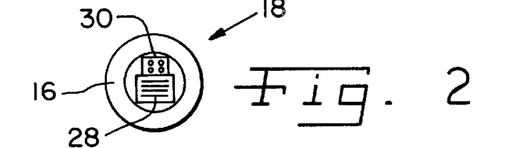
FIG. 2 is a top view of the containment transmitter assembly of FIG. 1.

Referring to FIGS. 1 and 2, containment transmitter assembly 12 includes a transmitter device 16 having a solar unit 18 and being mounted on a substantially vertical post 20. Solar unit 18 includes a solar cell 28 connected to a storage battery 30. The solar cell 28 has sufficient output capability to power containment transmitter device 16 and charge the storage battery 30 simultaneously. The storage battery 30 is capable of sourcing enough power for containment transmitter assembly 12 to permit reliable operation for extended periods when light is not available. Preferably, the storage battery 30 is a 4.5 ampere-hour battery. Transmitter device 16 transmits signals 22, which may be reflected off of ground surface 24. Signals 22 include both radio frequency (RF) reference signals (also referred to as synchronization signals) and lower frequency electromagnetic ranging signals. Containment transmitter assembly 12 includes a audio/video display 26 for displaying information, such as a built in test status and battery charge level.

Figure 3A:
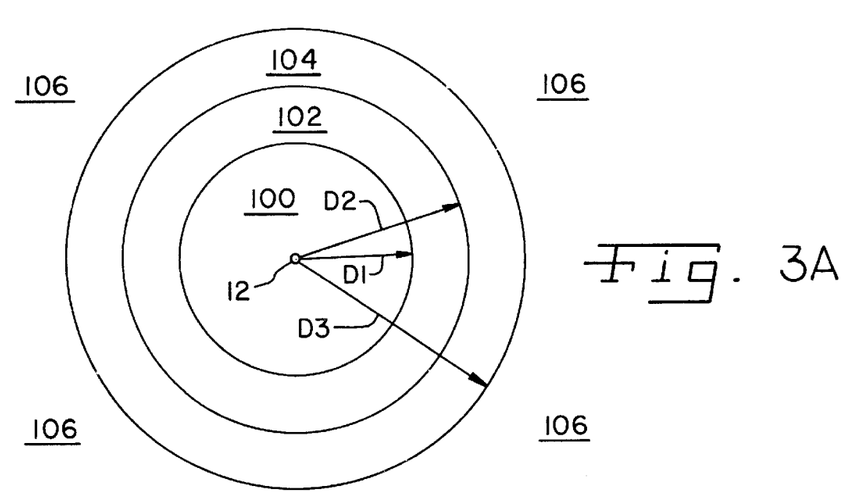
FIGS. 3A and 3B are top views illustrating the various zones associated with the invention.

As illustrated in FIG. 3A, containment transmitter assembly 12 and receiver assembly 14 cooperate to effectively divide the area surrounding containment transmitter assembly 12 into four zones: a confinement zone 100, a low correction zone 102, a high correction zone 104 and an outer, or OFF, zone 106. In the illustration of FIG. 3A, zones 100, 102 and 104 are shown to be substantially circular, however, those skilled in the art will recognize that the actual shape of the perimeter of each of zones 100, 102 and 104 will depend upon several factors, such as for example the amount and type of interference which may be experienced in the various zones, e.g., ground clutter.

The four zones 100, 102, 104 and 106 are defined in relation to the length of three radii, or distances, as measured from the location of containment transmitter assembly 12: distance D1, distance D2, and distance D3. Distance D1 defines the perimeter of confinement zone 100. Low correction zone 102 is defined by the difference between perimeter distances D1 and D2. High correction zone 104 is defined by the difference between perimeter distances D2 and D3. Outer zone 106 is defined as any location beyond containment transmitter assembly 12 at a distance greater than distance D3. In preferred embodiments of the invention, each of the distances D1, D2 and D3 are defined based upon an associated signal strength of the received electromagnetic ranging signal.

While animal 15 is within confinement zone 100, no stimulation is provided to animal 15 by receiver assembly 14. If animal 15 leaves confinement zone 100 and enters low correction zone 102, then receiver assembly 14 emits an audio stimulation, without being accompanied by a tactile stimulation (e.g., electrical shock or vibration), for a predetermined period of time. If, after the predetermined period of time animal 15 has not returned to confinement zone 100, then animal 15 will receive from receiver assembly 14 the audio stimulation accompanied by a low level tactile stimulation. If animal 15 continues to wander away from confinement zone 100 and enters high correction zone 104, a high level tactile stimulation will be applied to animal 15 by receiver assembly 14. If, however, animal 15 continues to wander away from confinement zone 100 and enters outer zone 106, animal 15 will receive no further stimulation from receiver assembly 14. Thus, animal 15 ceases receiving correction stimuli once animal 15 exceeds the distance D3 from the transmitter, to thereby spare animal 15 from unnecessary discomfort due to unproductive corrective stimulation. If, after the stimulation timeout has occurred, the animal re-enters the containment zone, no corrective stimulation is applied. This allows the animal to re-enter the desired confinement zone 100 area without being punished. Once within the confinement zone for a predetermined time, the system re-enables. Once the system re-enables, any attempt to exit the confinement zone 100 will result in stimulation as described previously in this paragraph.

Both the transmitter 12 and receiver 14 have built-in-test circuitry to check for internal hardware failures. If either containment transmitter assembly 12 or receiver assembly 14 suffer a hardware failure, receiver assembly 14 is structured such that animal 15 will not receive a stimulation.

Figure 3B:
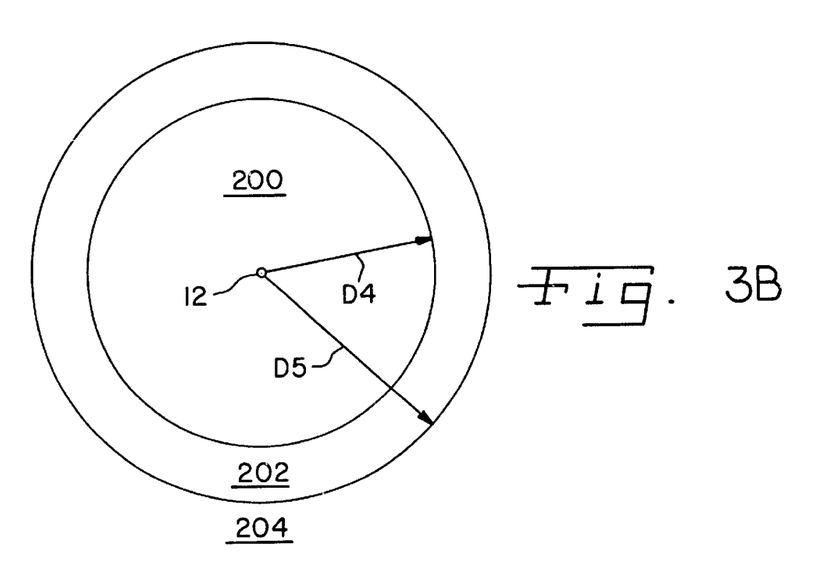

FIG. 3B illustrates a second boundary configuration that uses three zones: a confinement zone 200, a correction zone 202 and an outer, or OFF, zone 204. In the illustration of FIG. 3B, zones 200 and 202 are shown to be substantially circular, however, those skilled in the art will recognize that the actual shape of the perimeter of each of zones 200 and 202 will depend upon several factors, such as for example the amount and type of interference which may be experienced in the various zones, e.g., ground clutter.

The three zones 200, 202 and 204 are defined in relation to the length of two radii, or distances, as measured from the location of containment transmitter assembly 12: distance D4 and distance D5. Distance D4 defines the perimeter of confinement zone 200. Correction zone 202 is defined by the difference between perimeter distances D4 and D5. Outer zone 204 is defined as any location beyond containment transmitter assembly 12 at a distance greater than distance D5. In preferred embodiments of the invention, each of the distances D4 and D5 are defined based upon an associated signal strength of the received electromagnetic ranging signal.

While animal 15 is within confinement zone 200, no stimulation is provided to animal 15 by receiver assembly 14. If animal 15 leaves confinement zone 200 and enters correction zone 202, then receiver assembly 14 emits an audio stimulation accompanied by a progressively increasing tactile stimulation (e.g., electrical shock or vibration), for a predetermined period of time. If, after the predetermined period of time animal 15 has not returned to confinement zone 200, the tactile stimulation is ceased in order to prevent over exposure of animal to stimulation. If, animal 15 continues to wander away from confinement zone 200 and enters outer zone 204, animal 15 will receive no further stimulation from receiver assembly 14. Thus, animal 15 ceases receiving correction stimuli once animal 15 exceeds the distance D5 from the transmitter, to thereby spare animal 15 from unnecessary discomfort due to unproductive corrective stimulation. If, after the stimulation timeout has occurred, the animal re-enters the confinement zone 200, no corrective stimulation is applied. This allows the animal to re-enter the desired confinement zone 200 without being punished. Once within confinement zone 200 for a predetermined time, the system re-enables. Once the system re-enables any attempt to exit the confinement zone 200 will result in stimulation as described previously in this paragraph.

Again, both the containment transmitter assembly 12 and receiver assembly 14 have built-in-test circuitry to check for internal hardware failures. If either containment transmitter assembly 12 or receiver assembly 14 suffer a hardware failure, receiver assembly 14 is structured such that animal 15 will not receive a stimulation.

Containment transmitter assembly 12 and receiver assembly 14 will now be described with reference to FIGS. 4 and 5.

Figure 4:
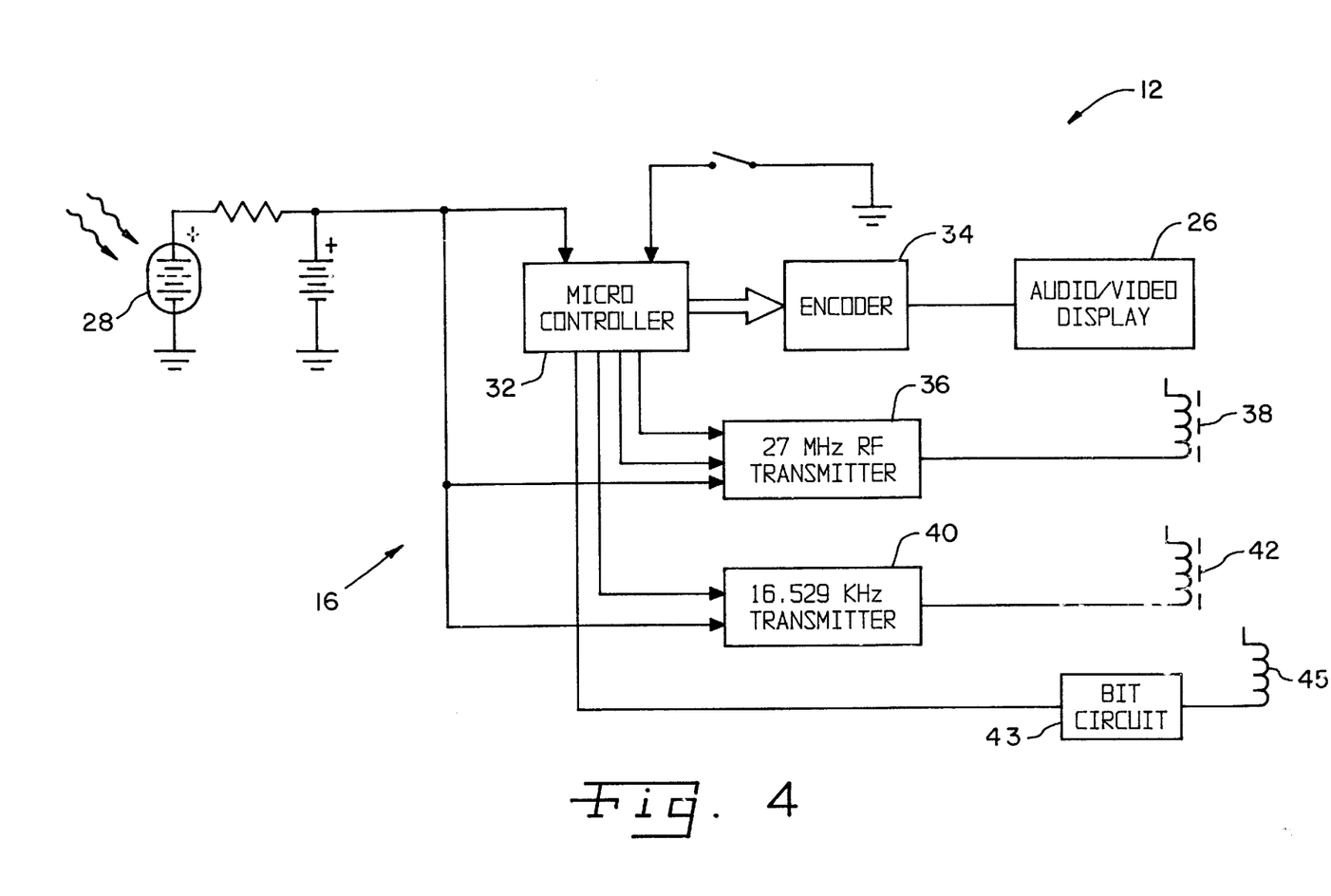
FIG. 4 is a schematic diagram of the containment transmitter assembly of FIG. 1.

Referring to FIG. 4, transmitter device 16 includes a microcontroller 32 which controls audio/video display 26 through an encoder 34. Microcontroller 32 also controls a transmitter 36 which transmits radio frequency (RF) synchronization signals via an antenna 38. Also, microcontroller 32 controls electromagnetic ranging signal transmitter 40 in order to cause an omnidirectional electromagnetic signal to be transmitted from an antenna 42. The microcontroller 32 controls a Built-In-Test (BIT) circuit 43 that monitors and reports the health of the unit via an antenna 45.

In order to efficiently use time and keep system latency to a minimum, the RF synchronizing signal and the electromagnetic ranging signal are sequenced to a specific timetable to allow power consuming hardware to be enabled for the minimum amount of time required. An example of this time sequencing is described herein. A 114 milliscecond (ms) 16.529 kilohertz (kHz) electromagnetic ranging signal pulse is sent, followed by a 20 ms wide FM coded 27 megahertz (MHz) synchronization signal pulse sent 32 ms after the start of the ranging signal. These signals are sent in bursts at a rate of approximately 4 bursts per second (every 0.25 seconds), which is the response latency of the system. Both signals are approximately omnidirectional. Transmitter 36 transmits the 27 MHz synchronization signal to qualify/correlate the 16.529 kHz electromagnetic ranging signal pulse.

Since the 27 MHz synchronization signal is capable of reaching beyond the sensing range of the 16.529 kHz ranging signal, the synchronization signal is uniquely coded with the Electronic ID of the system so that adjacent systems will not false alarm or interfere. The BIT circuitry 43 monitors the output of the 16.529 kHz signal to verify that it is transmitted. If the BIT circuitry 43 does not receive a valid indication that the 16.529 kHz ranging signal is being sent, containment transmitter assembly 12 suspends transmission of the 27 MHz synchronization reference signal. The absence of the 27 MHz synchronization signal at the receiver prohibits activation of the stimulation circuitry. Also, for each system, the approximately 4 burst per second transmit rate could be staggered slightly for differently coded reference signals to help eliminate transmission collisions for co-located systems. The 27 MHz synchronization signal uses about 26 milliamps of current peak with the resulting average transmit current being approximately 2.1 milliamps. The 16.529 kHz electromagnetic ranging signal uses a peak current of approximately 9.2 milliamps with an average transmit current being approximately 4.3 milliaiips. With the remaining circuitry using an additional 500 microamps the total average current drain of the containment transmitter assembly 12 is 7.0 milliamps. Thus, using a solar array with 50 milliamp output capability along with a storage battery 30 of sufficient capacity will permit containment transmitter assembly 12 to run continuously without interruption with a minimum of available sun light.

Figure 5:
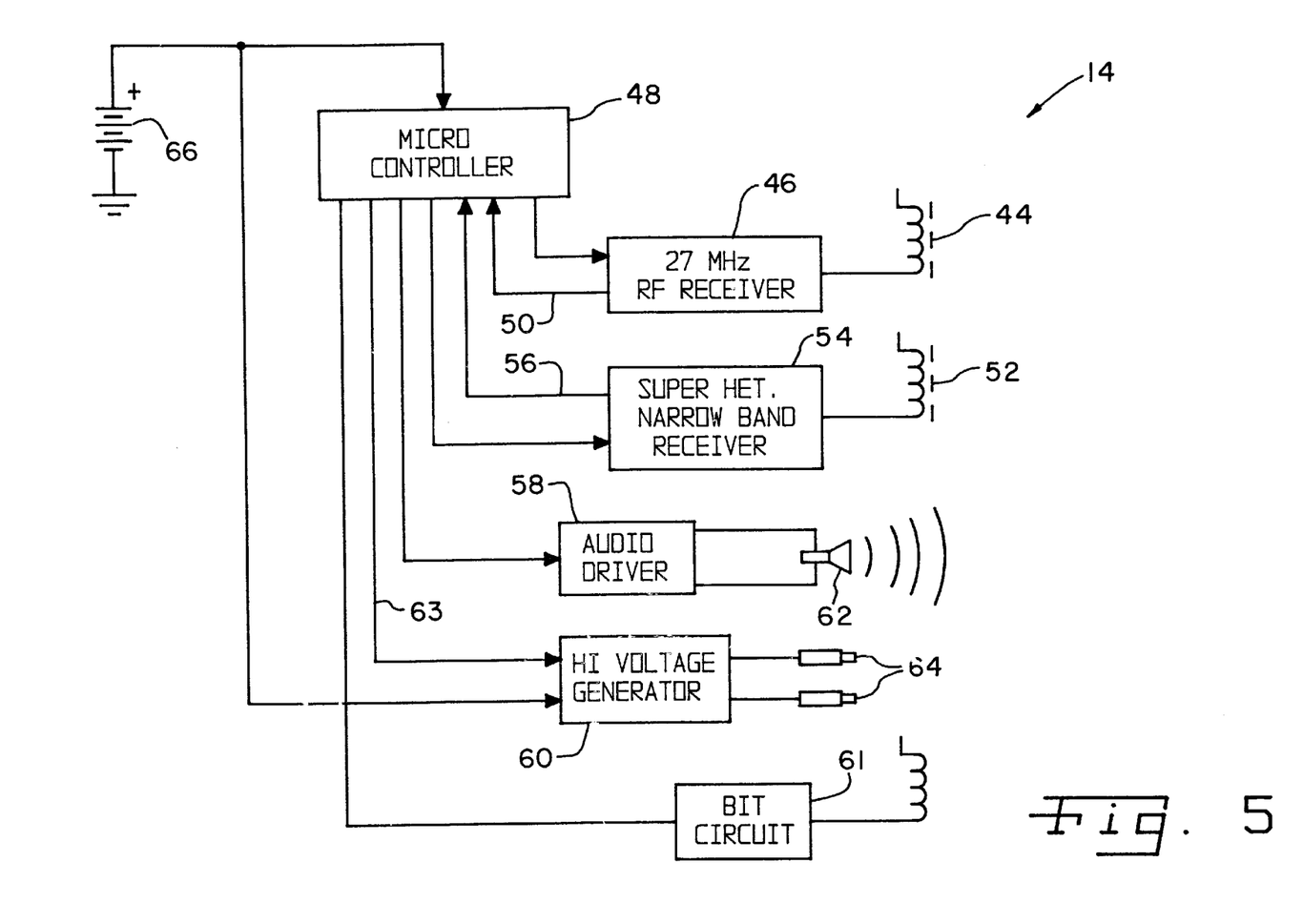
FIG. 5 is a schematic diagram of the receiver assembly of FIG. 1.

As shown in FIG. 5, receiver assembly 14 includes an antenna 44, a radio frequency receiver 46, a microcontroller 48, an antenna 52, a superheterodyne narrow band receiver 54, an audio driver 58, a high voltage generator 60, a BIT Circuit 61 and a battery 66. The RF synchronization signal emitted by antenna 38 of containment transmitter assembly 12 is received by antenna 44 of receiver assembly 14. Receiver 46 processes the RF synchronization signals received by antenna 44 that are on the frequency of the radio frequency signals produced by transmitter 36, which is preferably 27 MHz. Receiver 46 then sends the received data stream to microcontroller 48 on a data line 50. The microcontroller 48 then does the final processing on the signal to determine that a RF synchronization signal of the frequency of interest has been received. Antenna 52 of receiver assembly 14 receives the electromagnetic ranging signal emitted by transmitter 40. Then, superheterodyne narrow band receiver 54 sends a signal on data line 56 indicating to microcontroller 48 that an electromagnetic ranging signal within the narrow band of receiver 54 has been received. This narrow band includes the frequency of 16.529 kHz. Preferably, each of antenna 44 and antenna 52 is an omni-directional antenna, and can be for example, a ferrite core or triplexer antenna.

Microcontroller 48 selectively turns on an audio driver 58 and/or a high voltage generator 60 dependent upon the detected signal strength of the received electromagnetic ranging signals, as described in more detail below. Audio driver 58 drives a speaker 62 which emits an audible warning signal to the animal. Based on the control signals supplied by microcontroller 48 via conductor 63, high voltage generator 60 selectively produces a voltage difference between probes 64 in order to apply an electrical stimulus to the animal when probes 64 are in contact with the body of animal 15. As is well known, receiver assembly 14 can be attached to the dog's collar such that probes 64 are pressed or biased against the dogs fur and/or skin. Microcontroller 48, audio driver 58 and high voltage generator 60 are all powered by battery 66, which may be a replaceable lithium battery with a capacity of 1400 milliamp hours.

Referring again to FIG. 3A and 3B, prior to use with an animal, containment transmitter assembly 12 is initialized to establish the desired containment radius D1/D4, which in turn is used to define the size of confinement zone 100/200. To initialize containment transmitter assembly 12, the output power of the 16.529 kHz electromagnetic ranging signal is adjusted to provide the desired containment radius. In an alternate embodiment of the invention, the containment radius D1/D4 could be set at the receiver. This would be accomplished by having the transmitter output the ranging signal at a constant level which would yield the maximum containment radius for the system. The receiver would then be taken to a distance (D1/D4) where the desired containment radius is to be set. The receiver would then be put in a calibration mode and would sample the signal to noise ratio (SNR) at that point and store this value in memory. The receiver would then compare all future received ranging signals to this SNR value. If the SNR is greater than the stored value the receiver would assume it is inside the containment radius. If the SNR is below the stored value, the receiver would assume it is outside of the containment radius and tone/stimulate accordingly.

Receiver assembly 14 can use a 1400 milliamp-hour replaceable lithium battery 66 as its power source. Receiver 54 can use a micropower 16 kHz current starved CMOS inverter amplifier, with a micropower MOSFET mixer to provide a 150 hertz center intermediate frequency (IF). The IF uses a micropower active filter op amp to provide the 10 hertz final bandwidth for optimum sensitivity and interference rejection. Total quiescent current for receiver 54 is approximately 100 microamps. The 27 MHz reference receiver 46 is time synchronized to the 27 MHz transmitter 36 and only powers up when a transmission is anticipated. This architecture minimizes the "on time" for 27 MHz receiver 46 and greatly reduces power consumption for the unit. When receiver 46 is initially synchronized to transmitter 36, receiver 46 is powered continuously until the 27 MHz synchronization signal is acquired. Once acquired, receiver 46 is powered up only once every 250 milliseconds to re-synchronize the anticipated reference radio signal. If the synchronization signal is lost for any reason, receiver 46 stays on to re-acquire it. With a peak current draw of 4 milliamps, the average reference receiver current is 450 microamps. Since microcontroller 48 uses a 32 kHz local oscillator clock, microcontroller current drain is only 10 microamps, with total quiescent current being 560 microamps. This yields approximately 90 days of continuous operation for receiver assembly 14.

After the FM coded 27 MHz synchronization signal is received by receiver assembly 14, receiver assembly 14 then determines if the 16.529 kHz electromagnetic ranging pulse is present. If not present, the microcontroller determines that the receiver assembly 14, and thus animal 15, is out of the confinement zone and initiates a warning tone along with the lowest level tactile stimulation. This process is repeated with the tactile stimulation level increasing up to the maximum level unless the unit detects the presence of the 16.529 kHz ranging signal at the appropriate time in 4 successive windows. Once four successive decodes of the 16.529 kHz ranging signal are detected stimulation is stopped. Once twenty successive decodes of the 16.529 kHz ranging signal are detected the tactile stimulation level is reset to the lowest level. This sequencing allows the animal to re-enter the containment zone without receiving a correction.

The confinement system 10 operates in a manner to ensure that unproductive and/or unwarranted corrective signals are not applied to the animal. System 10 is designed so that if a hardware failure occurs at either the transmitter or receiver, no false shock signal can be discerned with an uncorrelated 16.529 kHz electromagnetic signal reception. Such uncorrelated electromagnetic pulse reception may be from any of several high amplitude broad noise sources, e.g., car ignitions, televisions, appliances, etc. A time based filtering algorithm allows very tight windowing for anticipated electromagnetic ranging pulses, and ensures that the uncorrelated electromagnetic pulse reception is not regarded as an electromagnetic ranging signal emitted by containment transmitter assembly 12.

Additionally, the receiver assembly 14 is designed to accept signals from the separate and portable training transmitter 13. Training transmitter 13 can be a handheld transmitter operating at 27 MHz and capable of transmitting different data packets corresponding to different commands, such as those available from Innotek, Inc. The receiver assembly 14 processes these commands received from training transmitter 13 and performs the desired action. These actions consist of applying different levels of tactile stimulation with or without an accompanying tone. Also, the unit may emit a tone without tactile stimulation. Receiver assembly 14 is designed to work with the containment transmitter assembly 12 enabled alone, the training transmitter 13 enabled alone or both transmitters 12, 13 enabled at the same time. When both transmitters 12, 13 are enabled, an additional command sent from training transmitter 13 is a containment field disable command which can temporarily or permanently disable processing of the containment transmitter 12 signals within receiver assembly 14.

In the embodiment shown and described above, containment transmitter assembly 12 has been described as transmitting a radio frequency synchronization (reference) signal and an electromagnetic ranging signal. However, it is to be understood that the method and system of the present invention can be carried out with other types of signals which propagate through air, so long as the synchronization signal and the ranging signal are distinguishable and have signal strengths which permit different signal propagation distances. Also, in the embodiment shown and described above, the radio frequency synchronization signal is transmitted during the electromagnetic ranging signal. However, it is to be understood that the electromagnetic ranging signal can also be transmitted before or after the radio frequency synchronization signal.

The preferred tactile stimulus applied to the animal has been described herein as an electrical shock. However, it is to be understood that the stimulus can also be any other type of unpleasant sensation or irritant, such as an audible tone, a smell, a spray, or a sensation caused by a mechanical device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of providing wireless confinement of an animal, comprising the steps of:
    selecting a location of a containment transmitter assembly;
    attaching a receiver assembly to said animal, said receiver assembly being adapted to selectively provide a corrective stimulation to said animal;
    selecting a first distance between said containment transmitter assembly and said receiver assembly to define a first zone within which no corrective stimulation is provided to said animal by said receiver assembly;
    selecting a second distance between said containment transmitter assembly and said receiver assembly to define a second zone beyond said first zone within which said corrective stimulation is provided to said animal by said receiver assembly;
    selecting a third distance between said containment transmitter assembly and said receiver assembly to define a third zone beyond said second zone within which said animal will receive no further corrective stimulation from said receiver assembly; and
    providing a training transmitter, separate from said containment transmitter assembly, for controlling said receiver assembly to selectively apply corrective stimulation to said animal regardless of a location of said receiver assembly with respect to said first zone, said second zone and said third zone.

2. The method of claim 1, wherein said corrective stimulation comprises at least one of an audio stimulation and a tactile stimulation.

3. The method of claim 2, wherein said tactile stimulation is at least one of an electrical shock and an emission of a scent.

4. The method of claim 1, further comprising the step of defining a fourth zone located between said second zone and said third zone within which a high level corrective stimulation is provided to said animal by said receiver assembly.

5. The method of claim 1, wherein if at least one of said containment transmitter assembly and said receiver assembly suffers a hardware failure, said animal will not receive said corrective stimulation.

6. The method of claim 1, wherein once said animal enters said third zone, said receiver assembly is disabled from providing further corrective stimulation.

7. The method of claim 1, wherein said containment transmitter assembly transmits a ranging signal.

8. The method of claim 7, further comprising the step of said receiver assembly receiving said ranging signal and comparing a signal strength of said ranging signal to a first threshold associated with said first distance.

9. The method of claim 8, further comprising the step of defining a second threshold associated with said second distance and a third threshold associated with said third distance based on a predefined signal strength reduction from said first threshold.

10. The method of claim 8, further comprising the step of determining said signal strength based on at least one of a signal amplitude and a signal-to-noise ratio of said ranging signal.

11. The method of claim 8, further comprising the step of said containment transmitter assembly transmitting a synchronization signal that said receiver assembly receives and uses to synchronize said ranging signal.

12. The method of claim 1, wherein said containment transmitter assembly is portable.

13. The method of claim 1, wherein said containment transmitter assembly is weatherproof.

14. The method of claim 1, wherein said containment transmitter assembly is solar powered.

15. A system for providing wireless confinement of an animal, comprising:
    a containment transmitter assembly which transmits a ranging signal having a signal strength which diminishes over a propagation distance;
    a receiver unit for receiving said ranging signal, said receiver unit having stored therein a first signal strength threshold corresponding a first distance between said containment transmitter assembly and said receiver unit, a second signal strength threshold corresponding to a second distance between said containment transmitter assembly and said receiver unit;
    a correction unit controllably connected to said receiver unit, said correction unit providing no corrective stimulation to said animal based on if said receiver unit determines said signal strength of said ranging signal is more than said first signal strength threshold, said correction unit providing corrective stimulation to said animal if said receiver unit determines said signal strength of said ranging signal is between said first signal strength threshold and said second signal strength threshold, and said correction unit providing no further corrective stimulation to said animal if said receiver unit determines said signal strength of said ranging signal is less than said third signal strength threshold; and
    a training transmitter, separate from said containment transmitter assembly, for selectively supplying a signal to said receiver to command said correction unit to apply corrective stimulation to said animal regardless of a location of said animal.

16. The system of claim 15, wherein said corrective stimulation comprises at least one of an audio stimulation and a tactile stimulation.

17. The system of claim 16, wherein said tactile stimulation is at least one of an electrical shock and a scent.

18. The system of claim 15, wherein said receiver unit has stored therein a third signal strength threshold corresponding to a third distance between said containment transmitter assembly and said receiver assembly, said correction unit provides a high level corrective stimulation to said animal if said receiver unit determines said signal strength of said ranging signal is between said second signal strength threshold and said third signal strength threshold.

19. The system of claim 15, wherein if at least one of said containment transmitter assembly and said receiver unit suffers a hardware failure, said animal will not receive said corrective stimulation.

20. The system of claim 15, wherein if said receiver unit determines said signal strength of said ranging signal is less than said third signal strength threshold, said correction unit is disabled from providing further corrective stimulation.

21. The system of claim 15, wherein said containment transmitter assembly transmits a synchronization signal for correlating said ranging signal.

22. The system of claim 21, wherein said receiver unit determines an origin of said ranging signal based on said synchronization signal.

23. The system of claim 15, wherein said signal strength is determined based on at least one of a signal amplitude and a signal-to-noise ratio of said ranging signal.

24. The system of claim 15, wherein said containment transmitter assembly is portable.

25. The system of claim 15, wherein said containment transmitter assembly is weatherproof.

26. The system of claim 15, wherein said containment transmitter assembly is solar powered.

27. A method for providing wireless confinement of an animal, comprising the steps of:
    providing a containment transmitter assembly for transmitting a ranging signal having a signal strength which diminishes over a propagation distance, and for transmitting a synchronization signal to be used to synchronize said ranging signal;
    providing a receiver attached to said animal for receiving said ranging signal and said synchronization signal;
    determining the presence or absence of said ranging signal at a predefined time based on a reception time of said synchronization signal;
    providing no corrective stimulation to said animal if said ranging signal is determined to be present;
    providing corrective stimulation to said animal if said ranging signal is determined to be absent; and
    prohibiting further corrective stimulation to said animal based on said ranging signal if said synchronization signal is determined to be absent.

28. The method of claim 27, further comprising the step of providing a separate handheld transmitter to send a training signal for directing corrective stimulation of said animal regardless of a location of said receiver relative to said ranging signal.

29. The method of claim 28, further comprising the steps of:
    providing said receiver with processing capability to identify said training signal; and
    applying an appropriate level of stimulation as dictated within said training signal sent from said handheld transmitter.

30. The method of claim 27, wherein said ranging signal is a low frequency electromagnetic signal and said synchronization signal is a radio frequency signal.

31. The method of claim 27, wherein if at least one of said containment transmitter assembly and said receiver suffers a hardware failure, said method further comprising the step of prohibiting said corrective stimulation to said animal.

32. A method for providing wireless confinement of an animal, comprising the steps of:
    providing a transmitter unit for transmitting a ranging signal having a signal strength which diminishes over a propagation distance;
    providing to said transmitter unit solar generated electrical power to provide truly wireless operation;
    providing a receiver for receiving said ranging signal;
    determining the presence or absence of said ranging signal;
    providing no corrective stimulation to said animal if said ranging signal is determined to be present;
    providing corrective stimulation to said animal if said ranging signal is determined to be absent.

33. The method of claim 32, further comprising the step of providing a separate handheld transmitter to send a training signal, said receiver responding to said training signal regardless of a position of said receiver relative to said ranging signal.

34. The method of claim 33, further comprising the steps of:
    providing said receiver with processing capability to identify said training signal; and
    applying an appropriate level of stimulation as dictated within said training signal sent from said handheld transmitter.

35. The method of claim 32, wherein if at least one of said transmitter unit and said receiver suffers a hardware failure, said method further comprising the step of prohibiting said corrective stimulation of said animal.

* * * * *